US005780149A

United States Patent [19]

McCurdy et al.

[11] Patent Number: 5,780,149
[45] Date of Patent: Jul. 14, 1998

[54] GLASS ARTICLE HAVING A SOLAR CONTROL COATING

[75] Inventors: Richard J. McCurdy; David A. Strickler, both of Toledo, Ohio

[73] Assignee: Libbey-Owens-Ford Co., Toledo, Ohio

[21] Appl. No.: 713,785

[22] Filed: Sep. 13, 1996

[51] Int. Cl.$^6$ ..................................................... B32B 15/00
[52] U.S. Cl. .................... 428/336; 428/212; 428/428; 428/432; 428/647; 428/699; 428/701; 428/702; 359/359; 359/361; 359/580; 359/581; 359/582; 359/586; 359/568; 359/589
[58] Field of Search ............................ 428/336, 212, 428/697, 699, 701, 702, 428, 432, 216; 359/359, 361, 580, 581, 582, 586, 588, 589

[56] References Cited

U.S. PATENT DOCUMENTS

| | | |
|---|---|---|
| 3,149,989 | 9/1964 | Johnson . |
| 3,279,317 | 10/1966 | Ploke . |
| 3,331,941 | 7/1967 | Edwards et al. . |
| 3,427,089 | 2/1969 | Webb . |
| 3,468,594 | 9/1969 | Vogl et al. . |
| 3,514,174 | 5/1970 | Gans et al. . |
| 3,591,248 | 7/1971 | Meunier . |
| 3,630,809 | 12/1971 | Edwards . |
| 4,127,789 | 11/1978 | Kostlin et al. . |
| 4,187,336 | 2/1980 | Gordon . |
| 4,206,252 | 6/1980 | Gordon . |
| 4,419,386 | 12/1983 | Gordon . |
| 4,504,109 | 3/1985 | Taga et al. . |
| 4,507,547 | 3/1985 | Taga et al. . |
| 4,583,815 | 4/1986 | Tuga et al. ................................ 350/1.6 |
| 4,977,013 | 12/1990 | Ritchie et al. ........................... 428/701 |
| 5,342,676 | 8/1994 | Zagdoun ................................. 428/428 |

FOREIGN PATENT DOCUMENTS

| | | |
|---|---|---|
| 546302 | 6/1993 | European Pat. Off. . |
| 2116590 | 9/1983 | United Kingdom . |

*Primary Examiner*—Archene Turner
*Attorney, Agent, or Firm*—Marshall & Melhorn

[57] ABSTRACT

A glass article having a solar control coating is disclosed for use in producing heat reducing glass for architectural windows. The coated article includes a glass substrate, an iridescence-suppressing interlayer deposited on and adhering to the surface of the glass substrate. At least a first transparent coating deposited on and adhering to the surface of the iridescence-suppressing coating and at least a second transparent coating deposited on and adhering to the surface of the first transparent coating. The first transparent coating and the second transparent coating have a difference in refractive indices in the near infrared region greater than a difference in the refractive indices in the visible region. The use of the article in architectural glazing results in a glazing that rejects solar energy in the near infrared region while permitting the transmittance of a high degree of visible light.

27 Claims, No Drawings

GLASS ARTICLE HAVING A SOLAR CONTROL COATING

BACKGROUND OF THE INVENTION

1. Field of the Invention

This invention relates to a coated glass article having a solar control coating. More particularly, this invention relates to a coating stack of an iridescence-suppressing interlayer, a first transparent coating, and a second transparent coating on a glass substrate that results in an article having a high degree of selectivity between the visible and near infrared regions of the spectrum. The selectivity, or the transmittance of visible light and the attenuation of near infrared energy, is accomplished through the utilization of at least first and second transparent coatings having similar refractive indices in the visible region while possessing different refractive indices in the near infrared region. Preferred coated glass articles exhibit a neutral color with the coating applied to a clear glass substrate.

2. Summary of Related Art

Coatings on architectural glass are commonly utilized to provide specific energy attenuation and light transmittance properties. Additionally, coatings provide desired reflective or spectral properties that are aesthetically pleasing. The coated articles are often used singularly or in combination with other glass articles to form a glazing or window unit.

The attributes of a coated glass substrate are dependent upon the specific coatings applied to the substrate. The coating compositions and thicknesses impart energy attenuation and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy attenuation and light transmittance properties in a coated glass article.

It is desirable to produce a coated glass article, especially for use in architectural glazings, that is capable of attenuating both near infrared and far infrared energy while permitting a high degree of visible light transmittance. Furthermore, it is preferred that the glazing possess a neutral color in both transmittance and reflectance to gain acceptance for use in homes and buildings. The attenuation of the near infrared and the far infrared energy may occur through either reflection or absorption. However, the reflection of the radiation is preferred in order to reject the radiation from the system. The reflection of near infrared energy results in a reduced solar transmittance while the reflection of the far infrared energy provides for a low emittance. The low emittance minimizes the indirect solar heat gain from absorption.

U.S. Pat. No. 4,504,109 to Taga et. al. discloses an infrared shielding lamination comprising alternate infrared shield layers and interferential reflection layers on a transparent substrate. The infrared shield layers reflect energy in the near infrared spectrum. A coated substrate having the lamination in accordance with the patent reflects infrared and near infrared without impairing the visible light transmittance.

U.S. Pat. No. 4,507,547 issued to Taga et. al. discloses a heat wave shielding lamination utilizing two types of infrared shield layers, each having different optical characteristics, laminated alternatively onto a glass substrate. The infrared shield layers have different refractive indices in the infrared spectrum but similar refractive indices in the visible light region to permit the passing of visible light while rejecting infrared energy.

In general, coated glass articles, such as described in U.S. Pat. Nos. 4,504,109 and 4,507,547, often exhibit iridescence or interference colors in reflected and transmitted light. It is desirable to provide architectural glazings free from iridescence, and preferably exhibiting a clear neutral color in both transmittance and reflectance. The iridescence from coatings on glass is an objectionable feature which is unacceptable for architectural applications.

Thus, the prior art suggests coatings on glass that are capable of reflecting near infrared energy while permitting the transmittance of visible light. However, conventional coatings or coating stacks do not suggest a coating means that permits both a desirable degree of selectivity between transmitted light and infrared energy and with freedom from iridescence (and thus capable of exhibiting a neutral color in both transmittance and reflectance on a clear glass substrate).

It would be advantageous to provide a coated glass article having a high degree of selectivity between visible light and near infrared energy. The high degree of selectivity would permit the transmittance of visible light while attenuating a significant amount of infrared energy. The attenuation of near infrared energy results in a reduced solar energy transmittance and therefore a low shading coefficient. The lower shading coefficient coupled with the transmittance of a high degree of visible light are desirable properties for architectural glazings.

It would also be advantageous to provide the solar reducing glazing that has an aesthetically pleasing neutral color in both transmittance and reflectance without exhibiting iridescence.

It would be a further advantage to provide a solar reducing glazing that minimizes the indirect heat gain from absorption. A low solar energy transmittance, and a high total solar reflection would significantly improve energy costs in buildings and homes.

SUMMARY OF THE INVENTION

In accordance with the present invention, there is provided a novel glass article useful for producing coated, heat reducing glass for architectural windows. The coated article includes a glass substrate, an iridescence-suppressing interlayer deposited on and adhering to the surface of the glass substrate, at least a first transparent coating deposited on and adhering to the surface of the iridescence-suppressing coating, and at least a second transparent coating deposited on and adhering to the surface of the first transparent coating. The use of the present inventive article in architectural glazings results in a glazing that rejects solar energy while permitting the transmittance of a high degree of visible light.

The specific coating stack on a clear glass substrate provides an iridescence free coated article having a high visible light transmittance and a reduced total solar energy transmittance. For example, a coated glass article made in accordance with the present invention may exhibit a visible light transmittance (Illuminant C) of at least ten percentage points higher than a solar heat transmittance with air mass 1.5 on a clear 3 mm glass substrate.

In accordance with the present invention, the iridescence-suppressing interlayer of the coating stack on the glass substrate provides a means to reflect and refract light to interfere with the observance of iridescence. The layer specifically eliminates iridescence so that the coated article may, if desired, be neutral colored in both reflectance and transmittance. Furthermore, the interlayer suppresses the observance of off angle colors. Single layer, multiple layer, or gradient layer color suppression coatings are suitable for use with the present invention.

The first transparent coating and the second transparent coating of the present invention have a difference in refractive indices in the near infrared region greater than a difference in refractive indices in the visible light region. The difference in refractive indices in the near infrared region provides an interface that serves to reflect near infrared radiation. The similar refractive indices in the visible region permits the transmittance of a high degree of visible light.

The first transparent coating is generally a doped metal oxide, a doped mixed metal oxide, or metal nitride. The second transparent coating is generally a metal oxide or mixed oxide with silica. The selection of the first and second transparent coatings is made in accordance with prescribed refractive indices to produce the desired transmittance properties. The noted coatings may also possess a low emissivity to minimize heat gain in an architectural glazing.

It is an object of the present invention to provide a coated, heat reducing glass article suitable for use as an architectural glazing. The coated glass article of the present invention transmits a high degree of visible light and reflects a significant amount of near infrared energy. The present invention utilizes at least a first transparent coating and a second transparent coating that have a difference in refractive indices in the near infrared region greater than a difference in refractive indices in the visible light region. The difference in refractive indices in the near infrared region provides an interface that serves to reflect near infrared radiation. The similar refractive indices in the visible region permits the transmittance of a high degree of visible light. The attenuation of near infrared energy results in a coated article having a reduced solar energy transmittance.

It is a further object of the present invention to provide an architectural glazing having a low emittance to minimize the indirect gain from absorption. The first transparent coating of the present invention is generally a low emissivity coating that lowers the overall emittance of the coated glass article.

It is also an object of the present invention to provide a coated glass article suitable for use as an architectural glazing having a neutral color in both reflectance and transmittance while maintaining the desired visible light transmittance. The coating stack of the present invention includes an iridescence-suppressing interlayer that is specifically applied to interfere with the observance of iridescence and thereby making possible the maintenance of a neutral color.

DETAILED DESCRIPTION OF THE PREFERRED EMBODIMENT

In accordance with the present invention, it has surprisingly been discovered that a coated glass article having a multilayered coating including an iridescence-suppressing layer, at least a first transparent coating, and at least a second transparent coating, provides an article which attenuates a significant amount of near infrared energy while permitting the transmittance of a high degree of visible light. The coated glass article is especially suitable for use in architectural glazings and windows. However, the coated glass article of the present invention may also be suitable for other applications, such as vehicle windows.

The glass substrates suitable for use in preparing the coated glass article according to the present invention may include any of the conventional clear or tinted glass compositions known in the art as useful for the preparation of architectural glazings. The preferred substrate is a clear float glass ribbon wherein the coatings of the present invention are applied in the heated zone of a float glass process. Other tinted substrates may be utilized as a substrate for the application of the coatings of the present invention. Tinted substrates may be selected to impart specific spectral properties in the coated article.

The iridescence-suppressing interlayer of the present invention provides a means to reflect and refract light to interfere with the observance of iridescence. Iridescence-suppressing coatings are conventionally known within the art. For example, U.S. Pat. Nos. 4,187,336, 4,419,386, and 4,206,252 herein incorporated by reference, describe coating techniques suitable for suppressing interference colors. The interlayer of the present invention may comprise a single iridescence-suppressing coating, a two component coating, or a gradient coating.

The color of light transmitted and reflected from coated glass substrates is measured according to the CIELAB color scale coordinates of a* and b*. A positive a* number indicates a red color hue and a negative value indicates a green color hue. A positive b* indicates yellow while a negative value indicates blue. A color saturation value, c*, is related to the observance of iridescence colors and is defined as the square root of $a^{*2}+b^{*2}$. A coated glass article having a saturation value or c* of less than 12 units will not exhibit iridescence.

With a single component interlayer, the suppression of iridescent colors may be accomplished by selecting an interlayer having a refractive index intermediate between the refractive indices of the glass substrate and the coating deposited onto the interlayer. The intermediate refractive index results in the reflections from the interfaces having the same wavelength. An interlayer thickness selection of ¼ wavelength of a 500 nm design wavelength serves to cancel out the reflected waves and therefore suppress iridescence. Compounds suitable for use include metal oxides or metal nitrides. The most preferred composition is a silicon oxycarbide.

In a two component interlayer, the coating deposited onto and adhering to the glass substrate has a high refractive index in the visible spectrum. A second coating, having a low refractive index, is deposited on and adheres to the first coating of the interlayer. Each interlayer has a thickness selected such that the interlayer forms a combined total optical thickness of about ⅙th to about 1/12th of a 500 nm design wavelength.

The coatings suitable for use as high refractive index coatings include various metal oxides and nitrides, and their mixtures which have the proper refractive index. The preferred coating for use with the present invention is tin oxide. The low index coating of the interlayer may include silicon dioxide, silicone polymer, magnesium oxide, and cryolite, with silicon dioxide being the preferred coating.

In accordance with the present invention, a gradient coating may be utilized as an iridescence-suppressing layer. A gradient coating generally comprises a layer which gradually transitions from one metal oxide or nitride film to another. Thus, the varying compositions result in a varying refractive indices which suppress iridescent colors. For example, a single gradient coating may include silica which gradually transitions into a tin oxide, cadmium stannate, silicon nitride, titanium oxide, or indium oxide.

The iridescence-suppressing interlayers are suitably applied onto the glass substrate through conventional thin film coating applications. For example, the layers may be applied onto a float glass substrate in the heated zone of a float glass process by known chemical vapor deposition techniques or other known pyrolytic techniques.

The first transparent coating and the second transparent coating in the multilayer stack of the present invention are designed to reflect a significant amount of near infrared energy above 700 nm to about 2000 nm while transmitting a high degree of visible light between 400 nm to 700 nm, with respect to integrated values. Either coating may also absorb near infrared radiation thus further reducing the solar energy transmittance of the coated article.

The reflection of the near infrared energy is accomplished through the use of high and low refractive indices with a design wavelength in the near infrared region. The difference between the high and low index layers increases the width of the reflection zone in the near infrared region to reject near infrared radiation.

The transmittance of visible light is accomplished by selecting first and second transparent coatings with similar refractive indices in the visible spectrum. The refractive indices in the visible region of the selected transparent coatings should be within about 0.2 units of each other. The similar refractive indices permit the transmittance and reflectance of light in a neutral color. Furthermore, the similarity in refractive indices in the visible spectrum enable the use of the noted interlayer for color suppression, since the first and second layers act as a single layer in the visible spectrum.

The first transparent coating of the present invention is deposited onto and adheres to the surface of the iridescence-suppressing interlayer. The first transparent coating may include a conductive coating which also provides a low emissivity value. The conductivity may be imparted to the coating through known doping agents. The doped oxides have a very low refractive index in the near infrared region due to the free electrons in the material and therefore permit the selection of a second transparent coating with a high refractive index to build a near infrared reflecting area at the interface between the first and second transparent coatings.

In accordance with the present invention, the first transparent coating may be selected from the group consisting of indium oxide doped with tin, indium oxide doped with fluorine, tin oxide doped with fluorine, tin oxide doped with antimony, zinc oxide doped with aluminum, zinc oxide doped with fluorine, zinc oxide doped with boron, cadmium stannate, zinc stannate, tungsten oxide, tungsten oxide doped with fluorine, titanium nitride, and vanadium nitride. The preferred compound is indium oxide doped with tin.

The conductivity of the oxides is dependent upon the electron carrier density of the coating and the electron mobility. The free carriers also provide for the attenuation of near infrared energy through absorption. Therefore, near infrared energy not reflected by the difference in refractive indices between the first and second transparent coatings may be absorbed by the free carriers in the first transparent coating. Additionally, the free carriers reflect some of the far infrared radiation. The result is a combination of both the reflection and absorption for the attenuation of solar energy. The preferred carrier density of the conductive films is greater than $5 \times 10^{20}$ per cubic centimeter.

Thus, the first transparent coating may additionally include low emissivity properties that minimizes heat gain through absorption. The low emittance of the coating minimizes the indirect gain from absorption for summer use and also produces a coated article having a low U value for winter use. The low emittance coating limits the inward transmission of radiant heat from the glass following the absorption of radiation.

The first transparent coating is deposited onto the coated substrate through the use of conventional deposition techniques. For example, the coating may be applied onto a glass ribbon substrate in the heated zone of a float glass production process. Other conventional methods of depositing the first transparent coating are suitable for use with the present invention.

In accordance with the present coated article, a second transparent coating is deposited on and adheres to the surface of the first transparent coating. The transparent coating has a refractive index in the near infrared region different than the refractive index for the first transparent coating. Examples of coating compositions suitable for use with the present invention include tin oxide, titanium oxide, aluminum oxide, indium oxide, zinc oxide, or a metal oxide mixed with silica. The preferred coating composition is tin oxide.

The second transparent coating of the present invention may be prepared by conventional processes known in the art. For example, a suitable coating may be deposited onto the first transparent coating through the decomposition of an organometallic or other metallic compound, or mixtures thereof, in an oxidizing atmosphere. Other methods of applying metal oxide coatings, or metal oxide coatings mixed with silica, onto a substrate are suitable for practicing the present invention.

An intermediate coating, similar to the second transparent coating, may be applied onto the iridescence-suppressing interlayer prior to applying the first transparent coating. The deposition of the intermediate coating results in a coating stack having a layer with a low refractive index in the near infrared region placed between layers with high refractive indices in the near infrared region. The high/low/high design attenuates near infrared energy by establishing a broader reflection zone to reflect near infrared energy. The layers all have similar refractive indices in the visible region to permit the transmittance of a high degree of visible light. An alternative low/high stack design, with the high refractive index film as the outer coating, may be repeated at least once on the first high/low/high stack to further improve the attenuation of near infrared energy. Coating compositions used for the second transparent coating are suitable for use with the intermediate coating.

The coated glass article of the present invention may include a glass substrate of any thickness which may be practiced in accordance with the float glass process. However, the preferred glass substrate is 0.125 inch clear glass. The thicknesses of the first and second transparent layers is dependent upon the desired solar performance of the stack. For example, the thickness of the first transparent layer may range from 2500 to 4500 angstroms while the second transparent layer may range from 800–1500 angstroms thick. For the alternative embodiment, the intermediate coating may range from 800–1500 angstroms thick.

The multilayered coatings of the present invention on a clear glass substrate may result in a coated glass article exhibiting neutral color in both reflectance and transmittance. The color is defined by the composition and thickness of the stack. The reflective color, measured from the glass substrate side of the coated article and defined on the CIELAB color scale system, preferably has an a* value of about 0 and a b* value of about 0. The transmitted color of the coated article, measured from the coated side of the coated article and defined on the CIELAB color scale system, preferably has an a* value of about −2 and a b* value of about −4. The transmitted and reflected color of the article are preferably aesthetically neutral, with the color saturation of the article, c*, as defined by the square root of $a^{*2}+b^{*2}$, less than 12 units.

The resulting coated article of the present invention, when applied to a nominal 3 mm clear glass substrate, exhibits a visible light transmittance (Illuminant C) of at least 10 percentage points higher than a total solar heat transmittance integrated with air mass 1.5, as defined in ASTM E891-87. With the preferred coating article of a nominal 3 mm clear glass substrate, tin oxide, silicon dioxide, indium oxide doped with tin, and tin oxide, the visible light transmittance (Illuminant C) is at least 60% and the total solar heat transmittance less than 50%. The low solar heat transmittance of the coated glass article results in a shading coefficient no greater than 0.65.

The coated glass article is ideally suited for use in architectural glazings. For example, the coated glass article may be utilized in an insulated glass unit wherein the article of the present invention functions as an outboard lite with a second clear glass article used as an inboard lite.

The insulated glass unit minimizes the heat transfer from the absorbing lite or clear glass substrate into the interior of the structure. The indirect gain, or the transmission of the absorbed radiation, is minimized if a low emissivity coating is utilized for the first transparent coating. The low emittance glass reflects or redirects the radiant heat generated from a warm object back toward the source. Additionally, the coated glass substrate is the exterior glass panel which enables outside convection from wind to minimize heat flow to the interior. The combination of the low emittance and near infrared attenuation properties of the present invention result in an insulated glass unit which rejects solar heat in the summer and exhibits a low U value, or retains heat, in the winter.

According to the preferred embodiment of the invention, an insulated glass unit, utilizing the coated glass article of the present invention, exhibits specific transmittance and spectral properties. The solar heat transmittance of the insulated glass unit is less than 50%. The insulated glass unit also exhibits a visible light transmittance (Illuminant C) greater than 60% and preferably greater than 65%. The shading co-efficient of the unit is no greater than 0.65. The insulated glass unit has an effective emittance value of less than 0.2. The low emittance value corresponds to a U value of less than 0.5.

The insulated glass unit preferably exhibits a neutral color in both reflectance and transmittance. The color saturation value of the unit, as defined on the CIELAB color scale system, is about 12 with a preferred value of about 8.

The following examples, which constitute the best mode presently contemplated by the inventor for practicing the present invention, are presented solely for the purpose of further illustrating and disclosing the present invention, and are not to be construed as a limitation on, the invention:

EXAMPLE I

A clear glass substrate was provided for depositing the coatings of the present invention. The glass substrate was 0.125 inch thick section of float glass ribbon previously produced in a float glass production process. An iridescence-suppressing interlayer was deposited onto the surface of the glass substrate in the heated zone of a float glass production process. The iridescence-suppressing layer included a tin oxide coating of 250 angstroms deposited on and adhered to the glass substrate. The tin oxide was applied by chemical vapor deposition in the heated zone of the float glass process by introducing dimethyl tin dichloride in an oxidizing atmosphere over the surface of the substrate.

A silicon dioxide coating of about 250 angstroms thick was applied onto the surface of the tin oxide coating by reacting dichlorosilane, in the presence of oxygen, near the surface of the substrate in the heated zone of the float process.

The clear glass substrate coated with the iridescence-suppressing interlayer was washed in a conventional dishwasher prior to applying the first and second transparent coatings of the present invention. The substrate was cleaned to remove any organic contamination on the surface of the interlayer.

An indium oxide coating doped with tin was deposited by standard magnetron sputtering. The sputtering operation is conventionally known in the art.

A tin oxide coating was deposited onto the surface of the Indium oxide tin doped coating. The tin oxide coating was also deposited by standard magnetron sputtering at a thickness of 120 nm.

The resulting coated glass article exhibited a visible light transmittance (Illuminant C) of about 60% and a total solar heat transmittance of less than 50%. The article had a neutral color in both reflectance and transmittance. The shading co-efficient was measured at 0.65.

EXAMPLE II

A coated article of 100 mm by 100 mm was produced in accordance with Example 1. However, the indium oxide coating doped with tin was applied in the present Example using a circular magnetron with a diameter of 203 mm. The coated glass article was utilized as an outboard light in an insulated glass unit with the multilayered stack of the present invention facing the interior of the structure. A clear glass substrate was used as the inboard light of the insulated glass unit and positioned at 12 mm from the coated article.

The unit had a total solar heat transmittance of 45.9% and visible light transmittance of 68.7%. The unit exhibited a neutral color in reflectance and transmittance. The shading co-efficient of the unit was measured at 0.534.

Predictive Example I

A float glass process is used to produce a float glass ribbon having a thickness of 0.125 inches. During the production of the float glass ribbon, four coatings are consecutively applied onto the glass substrate in the float bath through conventional chemical vapor deposition methods. A first coating of tin oxide is applied onto and adheres to the surface of the glass substrate at a thickness of about 301 Angstroms. A coating of silicon dioxide of about 249 Angstroms is then deposited onto the surface of the tin oxide coating. The first coating of tin oxide and the coating of silicon dioxide form an iridescence-suppressing interlayer. A tin doped indium oxide coating of about 2475 Angstroms thick is deposited onto the surface of the silicon dioxide. A final outer coating of tin oxide of about 1337 Angstroms thick is deposited onto the surface of the tin doped indium oxide coating.

The coated article is conveyed through the entire float glass process. The article is then is cut and sized for placement as an outboard lite in an insulated glass unit. A clear glass is utilized as the inboard lite. The insulated glass unit has a ⅛ inch gap or airspace between the outboard and inboard lites filled with argon.

The Drude parameters for the indium oxide coating doped with tin would include an electron concentration of about $1.0 \times 10^{27}$ per cubic meter and an effective mass of about 0.35. The high frequency dielectric constant for the coating would be about 3.0 with the scattering frequency of about $0.30 \times 10^{15}$ per second.

The insulated glass unit, utilizing the coated glass article as an outboard lite with the multilayered stack of the present invention facing the interior of the structure, would exhibit the beneficial color and transmittance properties of the present invention. The insulated glass unit would have an aesthetically neutral transmitted color with no observance of iridescence. The insulated glass unit would have a visible light transmittance (Illuminant C) of about 70% and a total solar energy transmittance of about 44%. The shading coefficient of the insulated glass unit would be about 0.57.

Predictive Example II

A float glass process is used to produce a float glass ribbon having a thickness of 0.125 inches. During the production of the float glass ribbon, four coatings are consecutively applied onto the glass substrate as disclosed in Predictive Example I. The first coating of tin oxide is applied at a thickness of about 318 Angstroms. The coating of silicon dioxide is deposited at a thickness of about 272 Angstroms. The first coating of tin oxide and the coating of silicon dioxide form an iridescence-suppressing interlayer. The tin doped indium oxide coating is deposited at a thickness of about 3495 Angstroms. The final outer coating of tin oxide is applied at a thickness of about 916 Angstroms.

The coated article is conveyed through the entire float glass process after which it is cut and sized for lacement as an outboard lite in an insulated glass unit.

The insulated glass unit, utilizing the coated glass article as an outboard lite with the multilayered stack of the present invention facing the interior of the structure, would exhibit the beneficial color and transmittance properties of the present invention. The insulated glass unit would have an aesthetically neutral transmitted color with no observance of iridescence. The insulated glass unit would have a visible light transmittance (Illuminant C) of about 63% and a total solar energy transmittance of about 39%. The shading coefficient of the insulated glass unit would be about 0.52.

Predictive Example III

A float glass process is used to produce a float glass ribbon having a thickness of 0.125 inches. During the production of the float glass ribbon, five coatings are consecutively applied onto the glass substrate in the float bath through conventional chemical vapor deposition methods. A first coating of tin oxide is applied onto and adheres to the surface of the glass substrate at a thickness of about 118 Angstroms. A coating of silicon dioxide of about 119 Angstroms is then deposited onto the surface of the tin oxide coating. The first two layers form an iridesense-suppressing interlayer. A second tin oxide coating is deposited onto and adheres to the silicon oxide coating. The second tin oxide coating has a thickness of about 1259 Angstroms. A tin doped indium oxide coating of about 2496 Angstroms thick is deposited onto the surface of the second tin oxide coating. A final outer coating of tin oxide, of about 1146 Angstroms thick, is deposited onto the surface of the tin doped indium oxide coating.

The coated article is conveyed through the entire float glass process. The article is then is cut and sized for placement as an outboard lite in an insulated glass unit. Clear glass is utilized as the inboard lite. The insulated glass unit has a ⅛ inch gap or airspace between the outboard and inboard lites filled with argon.

The insulated glass unit, utilizing the coated glass article as an outboard lite with the multilayered stack of the present invention facing the interior of the structure, would exhibit the beneficial color and transmittance properties of the present invention. The insulated glass unit would have an aesthetically neutral transmitted color with no observance of iridescence. The insulated glass unit would have a visible light transmittance (Illuminant C) of about 68% and a total solar energy transmittance of about 43%. The shading coefficient of the insulated glass unit would be about 0.56.

Predictive Example IV

A float glass process is used to produce a float glass ribbon having a thickness of 0.125 inches. During the production of the float glass ribbon, five coatings are consecutively applied onto the glass substrate as disclosed in Predictive Example III. The first coating of tin oxide is applied at a thickness of about 272 Angstroms. The coating of silicon dioxide is deposited at a thickness of about 333 Angstroms. The first two layers form an iridescence-suppressing interlayer. The second coating of tin oxide is deposited at a thickness of about 1074 Angstroms. The tin doped indium oxide coating is deposited at a thickness of about 3463 Angstroms. The final outer coating of tin oxide is applied at a thickness of about 1061 Angstroms.

The coated article is conveyed through the entire float glass process after which it is cut and sized for placement as an outboard lite in an insulated glass unit as disclosed in Predictive example III.

The insulated glass unit, utilizing the coated glass article as an outboard lite with the multilayered stack of the present invention facing the interior of the structure, would exhibit the beneficial color and transmittance properties of the present invention. The insulated glass unit would have an aesthetically neutral transmitted color with no observance of iridescence. The insulated glass unit would have a visible light transmittance (Illuminant C) of about 64% and a total solar energy transmittance of about 39%. The shading coefficient of the insulated glass unit would be about 0.51.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A coated glass article comprising:
   (a) a glass substrate, having a surface;
   (b) an iridescence-suppressing interlayer deposited on and adhering to the surface of the glass substrate;
   (c) a first transparent coating deposited on and adhering to the iridescence-suppressing interlayer; and
   (d) a second transparent coating deposited on and adhering to said first transparent coating, said first transparent coating and said second transparent coating having a difference in refractive indices in the near infrared region greater than a difference in refractive indices in the visible region, wherein the coatings, including the interlayer, are such as to provide, when applied to a clear nominal 3 mm glass substrate, a glass article having a visible light transmittance (Illuminant C) of at least 10 percentage points higher than a solar heat transmittance integrated with an air mass 1.5.

2. The coated glass article of claim 1, wherein the coatings including the interlayer are such as to provide a neutral color in transmittance and reflectance when applied to a clear glass substrate.

3. The coated glass article of claim 2, wherein said article exhibits a color saturation of less than 12 units, as defined by CIELAB color scale coordinates.

4. The coated glass article of claim 1, wherein said coated glass article has a visible light transmittance (Illuminant C) of at least 60% on a clear glass substrate at a nominal 3 mm thickness.

5. The coated glass article of claim 1, wherein said glass substrate is a clear float glass ribbon.

6. The coated glass article of claim 1, wherein said first transparent coating is selected from the group consisting of indium oxide doped with tin, indium oxide doped with fluorine, tin oxide doped with fluorine, tin oxide doped with antimony, zinc oxide doped with aluminum, zinc oxide doped with fluorine, zinc oxide doped with boron, cadmium stannate, zinc stannate, tungsten oxide, tungsten oxide doped with fluorine, titanium nitride, and vanadium nitride.

7. The coated glass article of claim 1, wherein said first transparent coating has a carrier density greater than about $5 \times 10^{20}$ per cubic centimeter.

8. The coated glass article of claim 1, wherein said second transparent coating is selected from the group consisting of tin oxide, titanium oxide, aluminum oxide, indium oxide, zinc oxide, and a metal oxide mixed with silica.

9. The coated glass article of claim 1, wherein said interlayer has a refractive index in the visible region defined as about the square root of the multiple of the refractive indices in the visible region of said glass and said first transparent coating, said interlayer having a total optical thickness of about ¼ wavelength of a 500 nanometer design wavelength.

10. The coated glass article of claim 1, wherein said interlayer further comprises two component layers including, (a) a first component layer of relatively high index refractive index material deposited on and adhering to the glass substrate;

(b) a second component layer of a relatively low refractive index material deposited on and adhering to the first component layer, wherein each component layer has a thickness such that the combined interlayer forms an iridescence suppressing means with a total optical thickness of about ⅙th to about ¹⁄₁₂th of a 500 nanometer design wavelength.

11. The coated glass article of claim 1, further comprising an intermediate coating deposited on and adhering to said iridescence-suppressing interlayer, said intermediate coating having a refractive index in the near infrared greater than the refractive index in the near infrared of the first transparent coating.

12. A coated glass article comprising:

(a) a glass substrate, having a surface;

(b) an iridescence-suppressing interlayer deposited on and adhering to the surface of the glass substrate;

(c) an indium oxide coating doped with tin deposited on and adhering to said iridescence-suppressing interlayer; and (d) a tin oxide coating deposited on and adhering to said indium oxide coating doped with tin, said indium oxide coating doped with tin and said tin oxide coating having a difference in refractive indices in the near infrared region greater than a difference in refractive indices in the visible region, wherein the coatings, including the interlayer, are such as to provide, when applied to a clear nominal 3-mm glass substrate, a glass article having a visible light transmittance (Illuminant C) of at least 10 percentage points higher than a solar heat transmittance integrated with an air mass 1.5.

13. The coated glass article of claim 12, wherein said coated glass article has an emittance less than or equal to about 0.2.

14. The coated glass article of claim 12, wherein said iridescence-suppressing interlayer includes a tin oxide coating deposited on and adhering to the surface of the glass substrate, and a silicon oxide coating deposited on and adhering to the tin oxide coating.

15. The coated glass article of claim 12, wherein said interlayer has a refractive index in the visible region defined as about the square root of the multiple of the refractive indices in the visible region of said glass and said first transparent coating, said interlayer having a total optical thickness of about ¼ wavelength of a 500 nanometer design wavelength.

16. The coated glass article of claim 12, wherein said interlayer further comprises two component layers including, (1) a first component layer of relatively high index refractive index material deposited on and adhering to the glass substrate;

(2) a second component layer of a relatively low refractive index material deposited on and adhering to the first component layer, wherein each component layer has a thickness such that the combined interlayer forms an iridescence suppressing means with a total optical thickness of about ⅙th to about ¹⁄₁₂th of a 500 nanometer design wavelength.

17. The coated glass article of claim 12, wherein the coatings including the interlayer are such as to provide a neutral color in transmittance and reflectance on a clear glass substrate at a nominal 3 mm thickness.

18. The coated glass article of claim 17, wherein said article exhibits a color saturation of less than 12, as defined by CIELAB color scale coordinates.

19. The coated glass article of claim 12, wherein said coated glass article has a visible light transmittance (Illuminant C) of at least 60% on a clear glass substrate at a nominal 3 mm thickness.

20. The coated glass article of claim 12, wherein said indium oxide coating doped with tin has a carrier density greater than $5 \times 10^{20}$ per cubic centimeter.

21. A coated glass article comprising:

(a) a glass substrate, having a surface;

(b) an iridescence-suppressing interlayer deposited on and adhering to the surface of the glass substrate;

(c) an intermediate coating deposited on and adhering to the iridescence-suppressing interlayer;

(d) at least one first transparent coating deposited on and adhering to the intermediate layer interlayer; and (e) at least one second transparent coating deposited on and adhering to said first transparent coating, said intermediate coating and said first transparent coating having a difference in refractive indexes in the near infrared region greater than a difference in refractive indexes in the visible region, said first transparent coating and said second transparent coating having a difference in refractive indices in the near infrared region greater than a difference in refractive indices in the visible region, wherein the coatings, including the interlayer, are such as to provide, when applied to a clear nominal 3 mm glass substrate, a glass article having a visible light transmittance (Illuminant C) of at least 10 percentage points higher than a solar heat transmittance integrated with an air mass 1.5.

22. The coated glass article of claim 21, wherein said first transparent coating is selected from the group consisting of indium oxide doped with tin, indium oxide doped with fluorine, tin oxide doped with fluorine, tin oxide doped with antimony, zinc oxide doped with aluminum, zinc oxide doped with fluorine, zinc oxide doped with boron, cadmium stannate, zinc stannate, tungsten oxide, tungsten oxide doped with fluorine, titanium nitride, and vanadium nitride.

23. The coated glass article of claim 4, wherein said intermediate coating and said second transparent coating are selected from the group consisting of tin oxide, titanium oxide, aluminum oxide, indium oxide, zinc oxide, and a metal oxide mixed with silica.

24. An insulated glass unit for architectural windows, comprising a coated glass article as defined in claim 1.

25. The insulated glass unit of claim 24, wherein said insulated glass unit has a neutral color in transmittance and reflectance.

26. The insulated glass unit of claim 24, wherein said insulated glass unit has a shading co-efficient no greater than 0.65.

27. The insulated glass unit of claim 24, wherein said insulated glass unit has a U value of less than 0.5.

* * * * *